US009996373B1

United States Patent
Anumalasetty et al.

(10) Patent No.: US 9,996,373 B1
(45) Date of Patent: Jun. 12, 2018

(54) AVOIDING OVERLOADING OF NETWORK ADAPTERS IN VIRTUAL ENVIRONMENTS

(71) Applicant: International Business Machines Corporation, Armonk, NY (US)

(72) Inventors: Kiran K. Anumalasetty, Marathalli (IN); Venkata N. S. Anumula, Hyderabad (IN); Vinod Kumar Boddukuri, Hyderabad (IN); Sanket Rathi, Hyderabad (IN); Rajaboina Yadagiri, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/710,870

(22) Filed: Sep. 21, 2017

Related U.S. Application Data

(63) Continuation of application No. 15/594,844, filed on May 15, 2017.

(51) Int. Cl.
| | |
|---|---|
| *G06F 9/455* | (2018.01) |
| *G06F 9/50* | (2006.01) |
| *H04L 29/08* | (2006.01) |
| *H04L 12/40* | (2006.01) |

(52) U.S. Cl.
CPC ........ *G06F 9/45533* (2013.01); *G06F 9/5077* (2013.01); *H04L 12/4013* (2013.01); *H04L 69/324* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,613,085 B2 * | 12/2013 | Diab | H04L 63/1441 703/17 |
| 8,937,965 B2 | 1/2015 | Shimozono et al. | |
| 9,336,041 B2 | 5/2016 | Raja et al. | |
| 9,495,222 B1 * | 11/2016 | Jackson | G06F 9/52 |
| 9,632,815 B2 | 4/2017 | Decusatis et al. | |
| 2012/0226800 A1 * | 9/2012 | Baratakke | H04L 49/70 709/224 |
| 2014/0007096 A1 * | 1/2014 | Arges | G06F 9/45533 718/1 |
| 2015/0095445 A1 | 4/2015 | Thankappan et al. | |
| 2016/0156566 A1 | 6/2016 | Srinivasan et al. | |

OTHER PUBLICATIONS

Appendix P List of IBM Applications or Patents Treated as Related. Dated Sep. 20, 2017. Two Pages.
Original U.S. Appl. No. 15/594,844, filed May. 15, 2017.

\* cited by examiner

*Primary Examiner* — Dong Kim
(74) *Attorney, Agent, or Firm* — Peter J. Hackmann

(57) ABSTRACT

An approach for avoiding overloads of network adapters. The approach receives one or more requests from one or more virtual machines, wherein the one or more requests are directed to one or more network adapters. The approach determines whether a first network adapter of the one or more network adapters is saturated. Responsive to a determination that the first network adapter is saturated, the approach sends a first busy event to a first virtual machine of the one or more virtual machines.

1 Claim, 3 Drawing Sheets

AVOIDING OVERLOADING OF NETWORK ADAPTERS IN VIRTUAL ENVIRONMENTS

BACKGROUND OF THE INVENTION

The present invention relates generally to the field of task management, and more particularly to resource allocation.

In a virtualized computing system, physical network adapters are virtualized by a host computing device. The physical network adapters are fully accessible by each virtual machine concurrently. The host computing device receives access requests from each virtual machine, and the host computing device sends the requests to the physical network adapters.

Fibre channel technology is a high-speed network technology typically running at 4, 8, 16, 32, and 128 gigabit per second rates (Gb). Fibre channels are primarily used to connect computer data storage to servers such as where storage area networks (SAN) are accessed in commercial data centers.

SUMMARY

According to an aspect of the present invention, there is a method, computer program product, and/or system for avoiding overloads of network adapters that performs the following steps (not necessarily in the following order): (i) receiving a first request from a first virtual machine and a second request from a second virtual machine, wherein the first request and the second request are directed to a first network adapter; (ii) determining whether the first network adapter is saturated, including determining whether a sum of requests exceeds a saturation limit of the first network adapter; (iii) responsive to a determination that the first network adapter is saturated, sending a first busy event to the first virtual machine, wherein the first busy event signals to the first virtual machine that the first network adapter is saturated; (iv) responsive to sending the first busy event to the first virtual machine, determining whether an alternate request is received from the first virtual machine within a predetermined period, wherein the alternate request is directed to a second network adapter; (v) responsive to a determination that the alternate request is received within the predetermined period, determining whether the first network adapter remains saturated; and (vi) responsive to a determination that the alternate request is not received within the predetermined period, sending a second busy event to a second virtual machine, wherein the second busy event signals to the second virtual machine that the first network adapter is saturated.

DETAILED DESCRIPTION

Embodiments of the present invention recognize that network adapters can be overloaded by factors, including heterogeneous network adapter speeds, heterogeneous bus speeds, traffic from other computing devices across a network, and traffic at the destination device. Embodiments of the present invention recognize that a particular network adapter can be saturated, or overloaded, while other network adapters have available bandwidth. For example, in a virtualized system a server may have multiple fibre channel host bus adapters (HBAs) that are virtualized using N_Port ID Virtualization (NPIV) and some associated virtual machines (VMs) may be serviced by multiple fibre channel HBAs. In that virtualized system, an HBA port may become overloaded with fibre channel traffic while there is available bandwidth on another HBA port. Embodiments of the present invention recognize that input/output (I/O) requests may be delayed by an overloaded network adapter.

Embodiments of the present invention provide the capability to determine whether a network adapter is saturated. Embodiments of the present invention provide the capability to asynchronously notify a virtual machine that a requested network adapter is saturated. Some embodiments send asynchronous overload signals (or busy events) to virtual machines in-band through a hypervisor-assisted channel. Embodiments of the present invention provide the capability to allow a virtual machine to move an I/O request to an alternate network adapter. Embodiments of the present invention provide the capability to manage multiple I/O from multiple virtual machines to multiple network adapters.

Implementation of embodiments of the invention may take a variety of forms, and exemplary implementation details are discussed subsequently with reference to the Figures.

Figure 1:
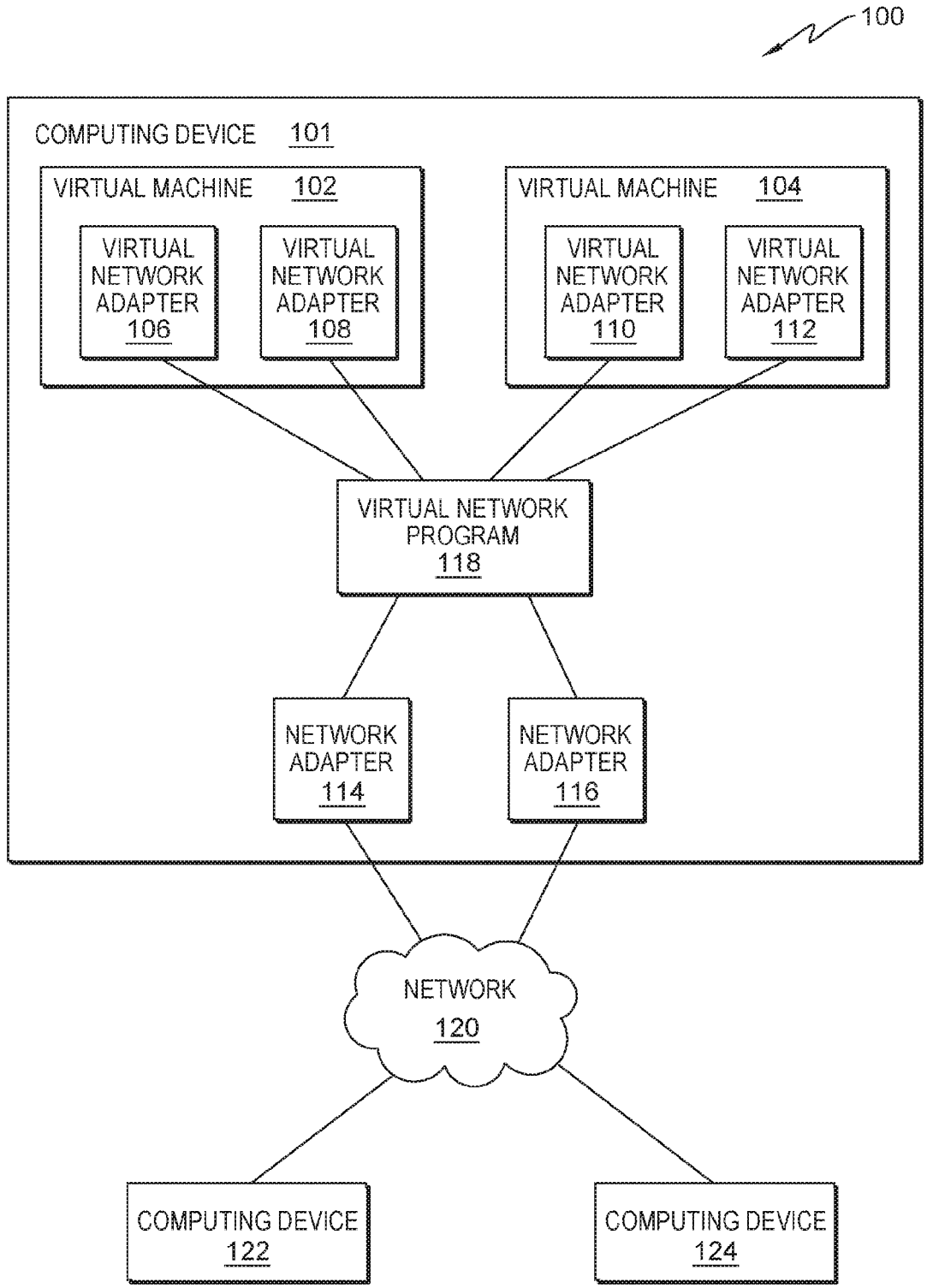
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing device 101 may be a computer system such as a management server, a web server, or any other electronic device or computing system capable of sending and receiving data. In one embodiment, computing device 101 may be a data center, consisting of a collection of networks and servers providing an information technology (IT) service, such as virtual servers and applications deployed on virtual servers, to an external party. In another embodiment, computing device 101 represents a "cloud" of computers interconnected by one or more networks, where computing device 101 is a computing system utilizing clustered computers and components to act as a single pool of seamless resources when accessed. This is a common implementation for data centers in addition to cloud computing applications. In still another embodiment, computing device 101 may be a desktop computer, laptop computer, a tablet computer, mobile device, or any other electronic device or computing system capable of communicating via a network. In one embodiment, computing device 101 represents a general-purpose computing device, such as computer system 310 of FIG. 3. In one embodiment, computing device 101 includes virtual machine 102, virtual machine 104, network host bus adapter 114, network host bus adapter 116, and virtual network host program 118.

Virtual machine 102 and virtual machine 104 may represent any number of virtual machines, executing on computing device 101. In some embodiments, more than two virtual machines may be present. Virtual machines 102 and 104 may emulate a computer system including guest operating systems. Computing device 101 may implement virtual machines 102 and 104 via software emulation, hardware emulation, or a combination of both. In some embodiments, virtual machine 102 includes virtual network adapter 106 and virtual network adapter 108, and virtual machine 104 includes virtual network adapter 110 and virtual network adapter 112. In one embodiment, each virtual machine includes one virtual network adapter corresponding with each network adapter of computing device 101. For example, virtual machine 102 may include virtual network adapters 106 and 108, corresponding with network adapters 114 and 116 respectively; and virtual machine 104 may include virtual network adapters 110 and 112, corresponding with network adapters 114 and 116 respectively.

Virtual network adapter 106, virtual network adapter 108, virtual network adapter 110, and virtual network adapter 112 may represent any number of virtual network adapters. In some embodiments, more than two virtual network adapters may be including in each virtual machine. Virtual network adapters 106, 108, 110, and 112 may emulate, simulate, or otherwise provide the equivalent functions of a physical network adapter to virtual machines 102 and 104. Virtual network adapters 106, 108, 110, and 112 may utilize N_Port ID Virtualization (NPIV) to virtualize network ports. In some embodiments, each virtual network adapter may be associated with a specific network adapter. For example, virtual network adapter 106 may provide access to network adapter 114, and virtual network adapter 108 may provide access to network adapter 108. Similarly in this example, virtual network adapter 110 may provide access to network adapter 114, and virtual network adapter 112 may provide access to network adapter 116.

Network adapter 114 and network adapter 116 may represent any number of network adapters. In some embodiments, more than two network adapters may be included in computing device 101. Network adapters 114 and 116 may be any adapter capable of communicating with other computing devices. For example, network adapters 114 and 116 may be fibre channel host bus adapters, Ethernet adapters, wi-fi adapters, Bluetooth adapters, or near-field communications (NFC) adapters. Network adapters 114 and 116 may communicate with a storage area network (SAN). In some embodiments, network adapters 114 and 116 are fibre channel host bus adapters (HBA) having various data processing rates. In some embodiments, the underlying Peripheral Component Interconnect (PCI) slots (not shown) of the fibre channel HBAs may have dissimilar data rates and/or channels.

Virtual network program 118 may be a software-based application, operating on a computer system, for managing network adapter access by virtual machines. Virtual network program 118 may receive input/output (I/O) requests from virtual network adapters 106, 108, 110 and 112, and virtual network program 118 may communicate the I/O requests to network adapters 114 and 116. Virtual network program 118 may receive I/O requests from network adapters 114 and 116, and virtual network program 118 may communicate the I/O requests to virtual network adapters 106, 108, 110, and 112. Virtual network program 118 may monitor I/O requests of each network adapter from the aggregate of all virtual machines, and virtual network program 118 may determine whether a network adapter is saturated. Virtual network program 118 may request virtual machines to re-direct I/O requests to non-saturated network adapters. The operations performed by virtual network program 118 are discussed further in the description of FIG. 2.

Network 120 may be any combination of connections and protocols capable of supporting communications between computing device 101, computing device 122, and computing device 124. Network 120 may include wire cables, wireless communication links, fiber optic cables, routers, switches, and/or firewalls. Computing device 101, computing device 122, and computing device 124 are interconnected by network 120. In one embodiment, network 120 may be the Internet, representing a worldwide collection of networks and gateways that use transmission control protocol/Internet protocol (TCP/IP) to communicate with one another. In other embodiments, network 120 may be implemented as a number of different types of networks, such as an intranet, a local area network (LAN), a virtual local area network (VLAN), a wide area network (WAN), or a storage area network (SAN). FIG. 1 is intended as an example and not as an architectural limitation for the different embodiments.

Computing device 122 and computing device 124 may be computer systems such as management servers, web servers, or any other electronic devices or computing systems capable of sending and receiving data. In one embodiment, computing devices 122 and 124 may be a data center, consisting of collections of networks and servers providing an information technology (IT) service, such as virtual servers and applications deployed on virtual servers, to an external party. In another embodiment, computing devices 122 and 124 represent a "cloud" of computers interconnected by one or more networks, where computing devices 122 and 124 are computing systems utilizing clustered computers and components to act as a single pool of seamless resources when accessed. This is a common implementation for data centers in addition to cloud computing applications. In still another embodiment, computing devices 122 and 124 may be desktop computers, laptop computers, tablet computers, mobile devices, or any other electronic devices or computing systems capable of communicating via a network.

In an embodiment, virtual network program 118 receives I/O requests. In an embodiment, virtual network program 118 determines that the requested network adapter is saturated. In an embodiment, virtual network program 118 sends a busy event to a virtual machine. In an embodiment, virtual network program 118 determines whether the requested network adapter is still saturated.

Figure 2:
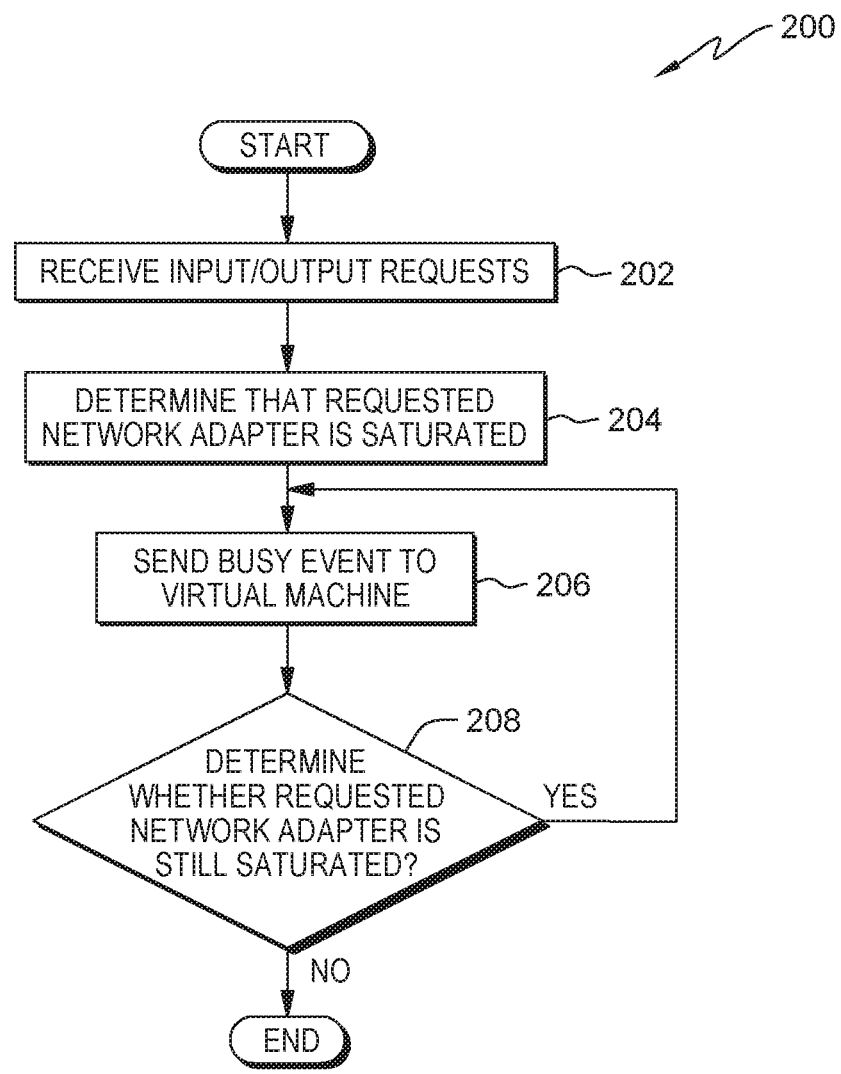
FIG. 2 is a flowchart depicting operational steps of a virtual network program, such as the virtual network program of FIG. 1, in accordance with an embodiment of the present invention.

FIG. 2 is a flowchart, generally designated 200, depicting operational steps of a virtual network program, such as virtual network program 118, in accordance with an embodiment of the present invention. The operational steps are in an order according to one embodiment. In other embodiments, the functions noted in the flowchart can occur out of the order noted in FIG. 2. Modification to the depicted order may be made by those skilled in the art without departing from the scope of the invention as recited by the claims.

Virtual network program 118 receives input/output (I/O) requests (202). Virtual network program 118 may receive I/O requests from one or more virtual machines, such as virtual machine 102 and virtual machine 104. For example, virtual network program 118 may receive an I/O request from virtual machine 102 via virtual network adapter 106. In some embodiments, virtual network program 118 may receive multiple I/O requests from each virtual machine via each virtual network adapter. In some embodiments, virtual network program 118 may create a queue to process the I/O requests in the order the requests are received. For example, virtual network program 118 may synchronously process a first I/O request from virtual machine 102 via virtual network adapter 106, a second I/O request from virtual machine 104 via virtual network adapter 110, and a third I/O request from virtual machine 102 via virtual network adapter 108. In some embodiments, virtual network program 118 may create a separate queue for each network adapter. For example, virtual network adapter 118 may create a first queue for I/O requests to network adapter 114 and a second queue for I/O requests to network adapter 116.

Virtual network program 118 determines that the requested network adapter is saturated (204). Virtual network program 118 may determine that the requested network adapter is saturated by monitoring the I/O requests for the requested network adapter. For example, virtual network program 118 may monitor the number and size of each of the I/O requests for network adapter 114 to determine that network adapter 114 is saturated. In some embodiments, where the I/O requests exceed the bandwidth of a network adapter, virtual network program 118 may determine that the network adapter is saturated. In one embodiment, virtual network program 118 determines whether the I/O requests exceed the full bandwidth of network adapter. In another embodiment, virtual network program 118 determines whether the I/O requests exceed a predetermined threshold bandwidth. For example, where the I/O requests exceed a predetermined threshold of 90% of the maximum bandwidth of network adapter 114, virtual network program 118 may determine that network adapter 114 is saturated.

Virtual network program 118 sends a busy event to a virtual machine (206). Virtual network program 118 may send a busy event by sending a signal to the requesting virtual machine to indicate that the requested network adapter is saturated. For example, virtual network program 118 may send an asynchronous busy event to virtual machine 102 to indicate that network adapter 114 is saturated. In some embodiments, virtual network program 118 may receive an alternate I/O request for a virtual machine in response to sending a busy event to the virtual machine. For example, virtual network program 118 may send a busy event to virtual machine 102 to indicate that network adapter 114 is saturated, and virtual network program 118 may receive an I/O request for network adapter 116 from virtual machine 102. In this example, virtual network program may cancel the initial I/O request from virtual machine 102 for network adapter 114, and virtual network program 118 may send the alternate request from virtual machine 102 to network adapter 116.

In some embodiments, virtual network program 118 may send a busy event to the virtual machine that requested the first I/O request in a network adapter queue; and, responsive to not receiving an alternate I/O request from the requesting virtual machine, virtual network program 118 may send a busy event to the virtual machine that requested the sequentially next I/O request in the queue. For example, virtual network program 118 may send a busy event to virtual machine 102 regarding a first I/O request in a queue for network adapter 114; and, responsive to receiving no alternate requests from virtual machine 102, virtual network program 118 may send a busy event to virtual machine 104 regarding a second I/O request in the queue for network adapter 114. In other embodiments, virtual network program 118 may use a predetermined order to send addition busy events. For example, virtual network program 118 may use a round-robin order to send a first busy event to virtual machine 102, a second busy event to virtual machine 104, and a third busy event to virtual machine 102. In one embodiment, virtual network program 118 sends a busy event regarding each successive I/O request until an alternate I/O request is received. In some embodiments, virtual network program 118 may pause before sending additional busy events. In the example above, virtual network program 118 may send a busy event to virtual machine 102, virtual network program 118 may pause for 10 milliseconds to prevent overloading virtual machines with multiple busy events, and virtual network program 118 may send a busy event to virtual machine 104.

Virtual network program 118 determines whether the requested network adapter is still saturated (208). Virtual network program 118 may determine whether the requested network adapter is still saturated by monitoring the I/O requests for the network adapter, as described in step 204. In one embodiment, virtual network program 118 may compare the number and size of each I/O request to the saturation limit of a network adapter. In another embodiment, virtual network program 118 may determine whether any cancelled I/O requests reduce the excess bandwidth requests below the saturation limit. Where the remaining I/O requests for a network adapter are below the saturation limit of the network adapter, virtual network program 118 may determine that the requested network adapter is not still saturated.

Responsive to a determination that the requested network adapter is still saturated ("YES" branch, 208), virtual network program 118 sends a busy event (208), as described above. In one embodiment, virtual network program 118 sends a busy event regarding the first I/O request in a queue for a network adapter. In another embodiment, virtual network program 118 sends a busy event regarding the first I/O request successive to an I/O request cancelled in response to a previous busy event. For example, where virtual network program 118 has sent a busy event to virtual machine 102, received an alternate I/O request from virtual machine 102, and determined that network adapter 114 is still saturated; virtual network program may send a busy event to virtual machine 104.

Responsive to a determination that the requested network adapters is not still saturated ("NO" branch, 208), virtual network program 118 completes an operation cycle. In one embodiment, virtual network program 118 again receives I/O requests (202), as described above. For example, virtual network program 118 may receive additional I/O requests, and virtual network program 118 may determine whether the requested network adapter is saturated.

Figure 3:
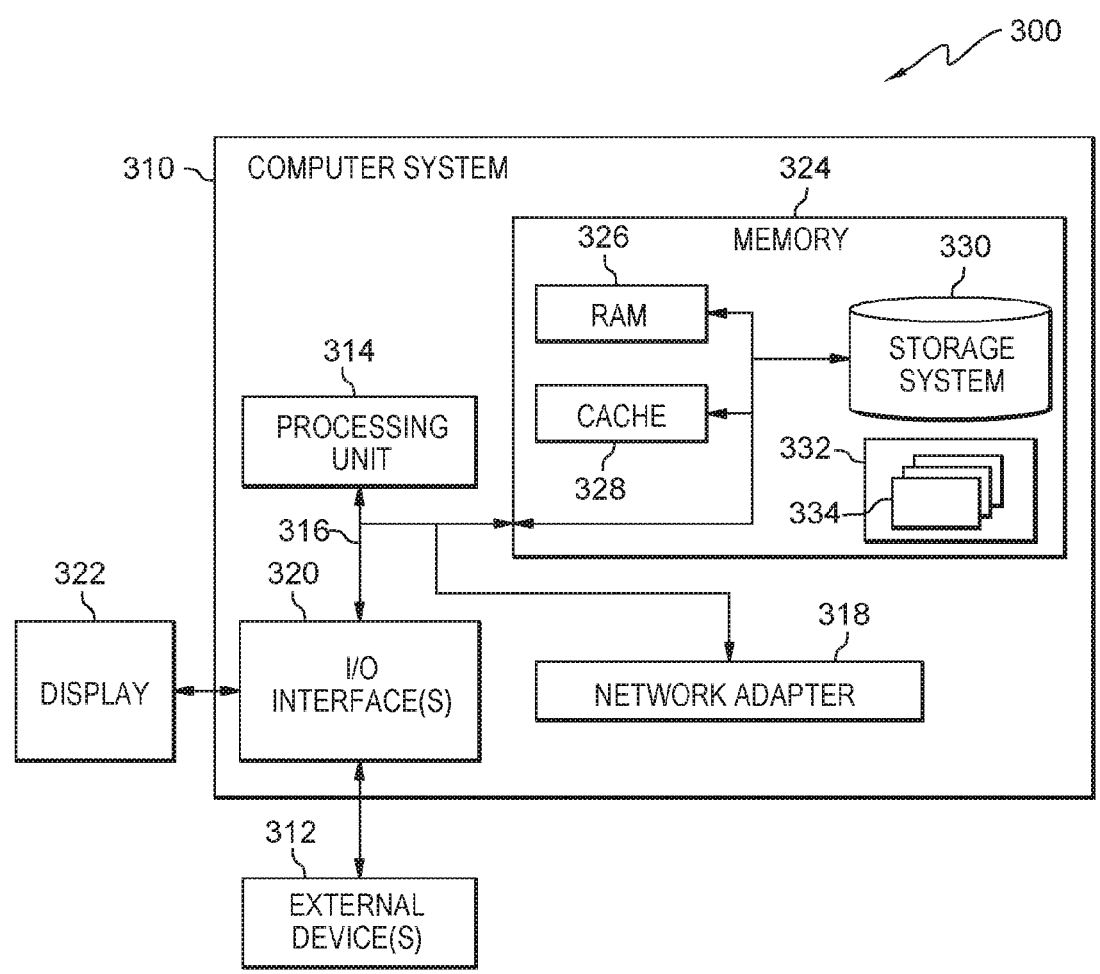
FIG. 3 depicts a block diagram of components of a computer system capable of executing a virtual network program, such as the computing device of FIG. 1, in accordance with an embodiment of the present invention.

FIG. 3 depicts a block diagram, generally designated 300, of components of a computer system capable of executing virtual network program 118, such as computing device 101, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

In one embodiment, computing device 101 is shown in the form of a general-purpose computing device, such as computer system 310. The components of computer system 310 may include, but are not limited to, one or more processors or processing unit 314, memory 324, and bus 316 that couples various system components including memory 324 to processing unit 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

As used herein, "application," "mobile application," or "app" encompasses application software that runs on (or is capable of running on) computing devices and performs specific tasks for a user of the computing device. In general, applications encompass any software file comprising instructions that can be understood and processed on a computing device, such as, for example, drivers, executable files, library modules, object files, script files, interpreter files, executable modules and the like. An application may be capable of being decompiled (decompiling is a process of translating a file, such as an executable file, containing information at a relatively low level of abstraction, such as assembly language, into a higher level of abstraction that may be human readable, such as programming languages like C++). Applications may include native applications (pre-installed on the computing device by a vendor) such as address books, calendars, calculators, games, maps, and web browsers. Applications may also be downloaded from a plurality of application software distribution platforms via a network for execution on a computing device, such as efficient booting system.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A computer-implemented method for avoiding overloads of network adapters, the method comprising:
   receiving a first request from a first virtual machine and a second request from a second virtual machine, wherein the first request and the second request are directed to a first network adapter;
   determining whether the first network adapter is saturated, including determining whether a sum of requests exceeds a saturation limit of the first network adapter;
   responsive to a determination that the first network adapter is saturated, sending a first busy event to the first virtual machine, wherein the first busy event signals to the first virtual machine that the first network adapter is saturated;
   responsive to sending the first busy event to the first virtual machine, determining whether an alternate request is received from the first virtual machine within a predetermined period, wherein the alternate request is directed to a second network adapter;
   responsive to a determination that the alternate request is received within the predetermined period, determining whether the first network adapter remains saturated; and
   responsive to a determination that the alternate request is not received within the predetermined period, sending a second busy event to a second virtual machine, wherein the second busy event signals to the second virtual machine that the first network adapter is saturated.

\* \* \* \* \*